(12) United States Patent
Koo et al.

(10) Patent No.: US 6,298,161 B1
(45) Date of Patent: Oct. 2, 2001

(54) APPARATUS AND METHOD FOR DECODING DIGITAL IMAGE WITH FUNCTION OF SUPPRESSING BLOCKING EFFECT

(75) Inventors: Heon Mo Koo; Hee Sub Lee; Cheol Hong Min, all of Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/030,851

(22) Filed: Feb. 26, 1998

(30) Foreign Application Priority Data

Feb. 28, 1997 (KR) ................................................ P97/6626

(51) Int. Cl.$^7$ ...................................................... G06K 9/40
(52) U.S. Cl. ...................... 382/233; 382/264; 382/268; 382/275
(58) Field of Search ..................................... 382/268, 275, 382/250, 264, 233; 348/607; 375/240.29

(56) References Cited

U.S. PATENT DOCUMENTS

| | | | | |
|---|---|---|---|---|
| 4,754,492 | * | 6/1988 | Malvar .................................... | 382/41 |
| 5,384,849 | * | 1/1995 | Jeong ...................................... | 382/56 |
| 5,539,663 | * | 7/1996 | Agarwal ................................ | 348/396 |
| 5,555,029 | | 9/1996 | Kim ....................................... | 348/607 |
| 5,590,064 | * | 12/1996 | Astle ............................... | 364/715.02 |
| 5,694,492 | * | 12/1997 | Kim ..................................... | 382/262 |
| 5,734,757 | * | 3/1998 | Kim ..................................... | 382/268 |
| 5,852,475 | | 12/1998 | Gupta et al. .......................... | 348/607 |
| 5,926,791 | * | 7/1999 | Ogata ................................. | 382/240.8 |
| 5,982,459 | * | 11/1999 | Fandrianto et al. ............... | 348/845.2 |
| 6,188,799 | * | 2/2001 | Tan et al. ............................. | 382/260 |

FOREIGN PATENT DOCUMENTS

| | | |
|---|---|---|
| 96-3420 | 1/1996 | (KR) . |
| 96-39996 | 11/1996 | (KR) . |

OTHER PUBLICATIONS

Huang. "Adaptive Filtering of Block Effects Based on Edge Map." 3rd Int. Conf. on Signal Processing, 1996, Oct. 14, 1996, vol. pp. 583–586.

Lee et al. "Blocking Effect Reduction of JPEG Images by Signal Adaptive Filtering." IEEE Transactions on Image Processing, vol. 7, No. 2, Feb. 1998, vol. 7, No. 2, pp. 229–234.

Lynch et al. "Post Processing Transform Coded Images Using Edges." ICASSP–95, Int. Conf. on Acoustics, Speech and Signal Processing, May 9, 1995, vol. 4, pp. 2323–2326.

Kuo et al. "Adaptive Postprocessor for Block Encoded Images." IEEE Transactions on Circuits and Systems for Video Technology, vol. 5, No. 4, Aug. 1995, pp. 298–304.

* cited by examiner

Primary Examiner—Jon Chang
(74) Attorney, Agent, or Firm—Fleshner & Kim, LLP

(57) ABSTRACT

A digital image decoding apparatus wherein image coded in accordance with an image coding method adopting the discrete cosine transform (DCT) are decoded without generating blocking picture components. In the apparatus, a data decoder performs the inverted discrete cosine transform (IDCT) for the image data coded in accordance with the coding method adopting the DCT to decode original image data. A selective filter selectively filters the decoded image data from the data decoder, thereby eliminating the blocking picture components.

14 Claims, 5 Drawing Sheets

APPARATUS AND METHOD FOR DECODING DIGITAL IMAGE WITH FUNCTION OF SUPPRESSING BLOCKING EFFECT

BACKGROUND OF THE INVENTION

1. Field of the Invention

This invention relates to a technique for decoding an image coded in accordance with an image coding method adopting the discrete cosine transform (DCT) standard, and more particularly to a digital image decoding apparatus and method that is adapted to suppress or reduce the discontinuity in image blocks, referred to as the blocking effect.

2. Description of the Prior Art

Data compression is required for handling large amounts of information resulting from the recent multimedia tendency in communication media. Accordingly, there have been developed various information compression techniques. The most typical example in these information compression techniques includes an image coding method proposed by the motion picture expert group (MPEG). This MPEG coding method codes image data to a type of bit stream and supplies the coded bit stream to storage media or communication media, thereby reducing a transfer rate of data, a band width of the communication media, a storage space of the storage media and so on.

In the MPEG coding method providing the above advantages, the DCT is used as a basic principle of information compression. This results from the DCT having a tendency of concentrating frequency characteristics irregularly distributed on the field into the low frequency region. Accordingly, the MPEG coding method performs an operation called "quantization", in which the high frequency region is ignored after discrete cosine transforms, and thus is capable of reducing a loss of information to compress a picture efficiently. Further, in the MPEG coding method, the DCT is performed in a square block unit including a certain size of pixels, i.e., 8×8 pixels or 16×16 pixels, for one picture field. This DCT processing scheme acts as a factor that forces pixels in the boundaries of the square block to have discontinuous values in combination with the above-mentioned DCT characteristic of concentrating an information into the low frequency region. In other words, in the MPEG decoding method, there appears the discontinuity of image called "blocking effect" that makes a significant difference between values of pixels in the boundaries of a certain square block and those in the adjacent square blocks.

Figure 1:
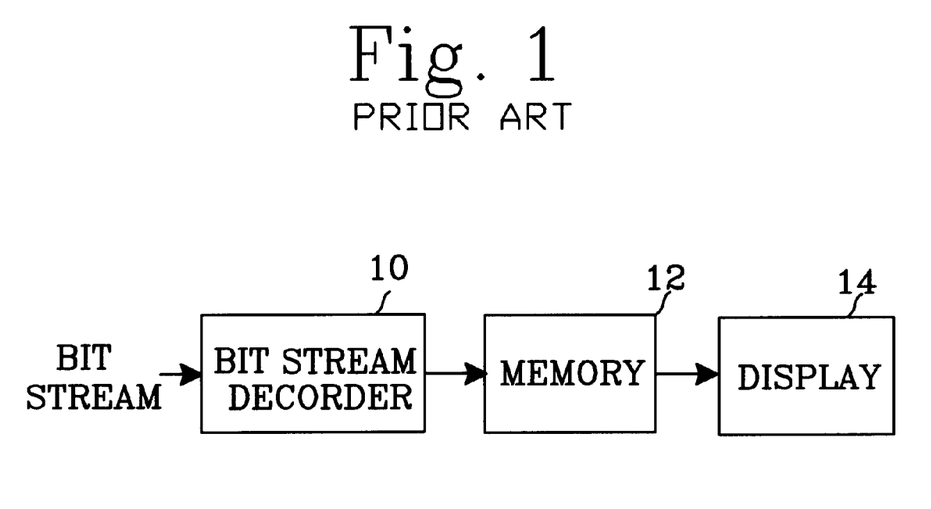
FIG. 1 is a schematic block diagram showing a conventional digital image decoding apparatus.

Image data compressed in accordance with the MPEG coding method adopting the DCT is decoded by means of a digital image decoding apparatus, as shown in FIG. 1, that includes a bit stream decoder 10, a memory 12 and a display 14. The bit stream decoder 10 performs the inverted quantization for a bit stream to derive high frequency components ignored upon coding and then performs the inverted discrete cosine transform (IDCT) of the inverted quantized data, thereby decoding the image data. The image data reconstructed by the bit stream decoder 10 pass through the memory 12 and is displayed on the display 14.

Figure 2:
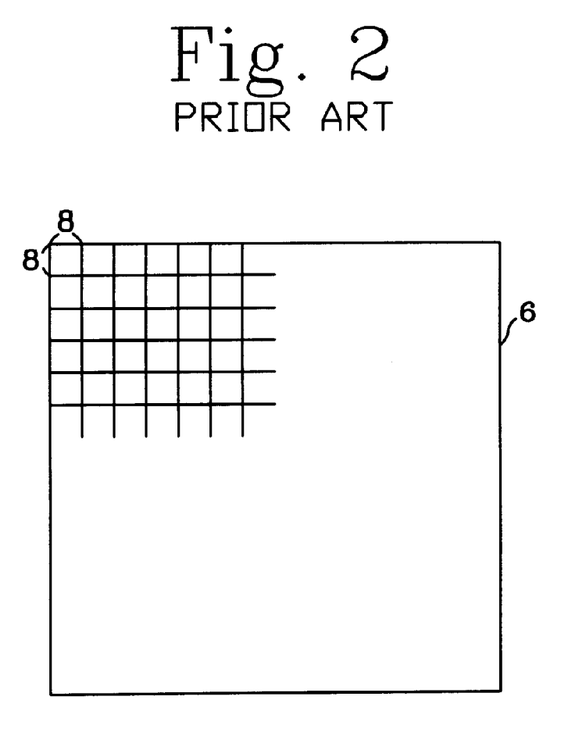
FIG. 2 illustrates a state of a picture field in which MPEG image data are displayed by the digital image decoding apparatus shown in FIG. 1.

However, square blocks divided into a constant size as shown in FIG. 2 appear in the picture displayed by the digital image decoding apparatus as described above. This is caused by a fact that picture information concentrated in a mutually different frequency in a constant size of square block unit by the DCT upon MPEG coding is not reconstructed into its original form. This discontinuity of picture, that is, the blocking effect deteriorates a visuality of user and gives rise to "artifacts" in the boundaries of square blocks, thereby causing the user to feel an eye strain. For these reasons, the digital image decoding apparatus requires a function of suppressing or reducing the discontinuity of image or the blocking effects.

SUMMARY OF THE INVENTION

Accordingly, it is an object of the present invention to provide a digital image decoding apparatus and method that is capable of decoding the picture coded in accordance with the image coding method adopting the DCT standard.

In order to achieve the above and other objects of the invention, a digital image decoding apparatus according to an aspect of the present invention includes input means for receiving image data coded in accordance with a coding method adopting the discrete cosine transform (DCT), decoding means for performing the inverted discrete cosine transform (IDCT) for the coded image data from the input means to decode original image data, and filtering means for selectively filtering the decoded image data from the decoding means to eliminate blocking picture components.

A digital image decoding method according to another aspect of the present invention includes the steps of receiving image data coded in accordance with a coding method adopting the discrete cosine transform (DCT), performing the inverted discrete cosine transform (IDCT) for the coded image data to decode original image data, and selectively filtering the decoded image data to eliminate blocking picture components.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 3:
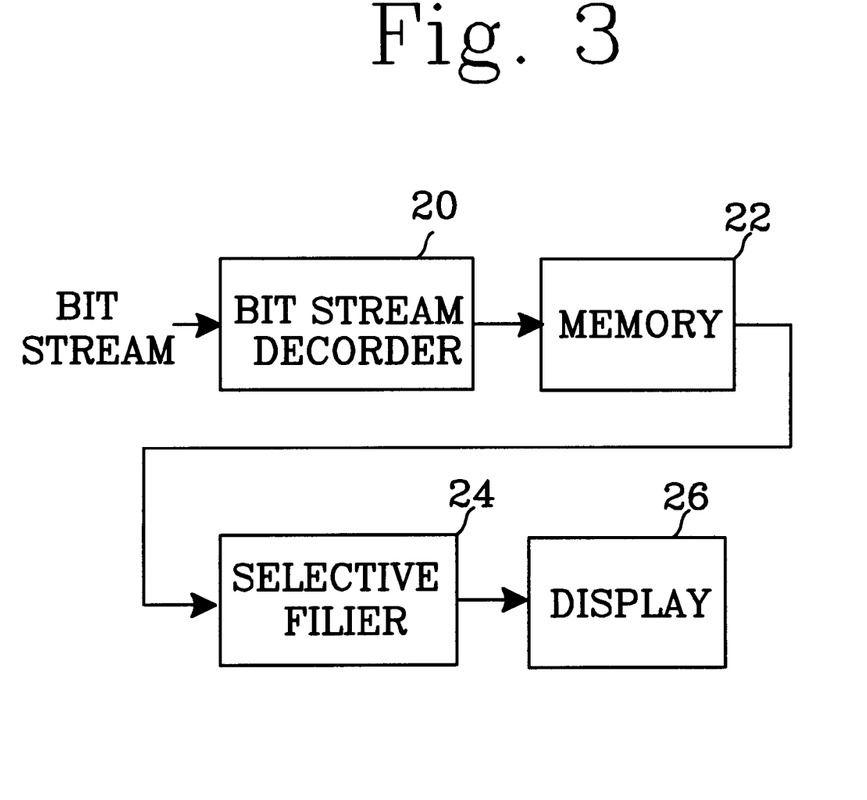
FIG. 3 is a schematic block diagram showing a digital image decoding apparatus with a blocking suppressing function according to an embodiment of the present invention.

Referring to FIG. 3, there is shown a digital image decoding apparatus with a function of suppressing the blocking effects according to an embodiment of the present invention. The digital image decoding apparatus includes a bit stream decoder 20 for receiving a bit stream, and a serial connection of a memory 22, a selective filter 24 and a display with the bit stream decoder 20. A bit stream inputted to the bit stream decoder 20 contains image data compressed by the MPEG coding apparatus including the DCT and quantization processing. The discontinuity of image resulting from picture components causing the advent of square blocks, hereinafter referred to as "blocking picture components", exists in the image data decoded by means of the bit stream decoder 20. The memory 22 temporarily stores the image data from the bit stream decoder 20. The selective filter 24 connected between the memory 22 and the display 26 partially filters the image data to be transferred from the memory 22 into the display 26, thereby eliminating the blocking picture components included in the image data. At this time, the selective filter 24 makes a low pass filtering of pixel data for pixels that are disposed on the boundary portions in a constant size of square blocks divided by the digital image decoding apparatus. The image data is filtered by the selective filter 24, so that any square blocks do not appear in the picture displayed on the display 26.

Figure 4:
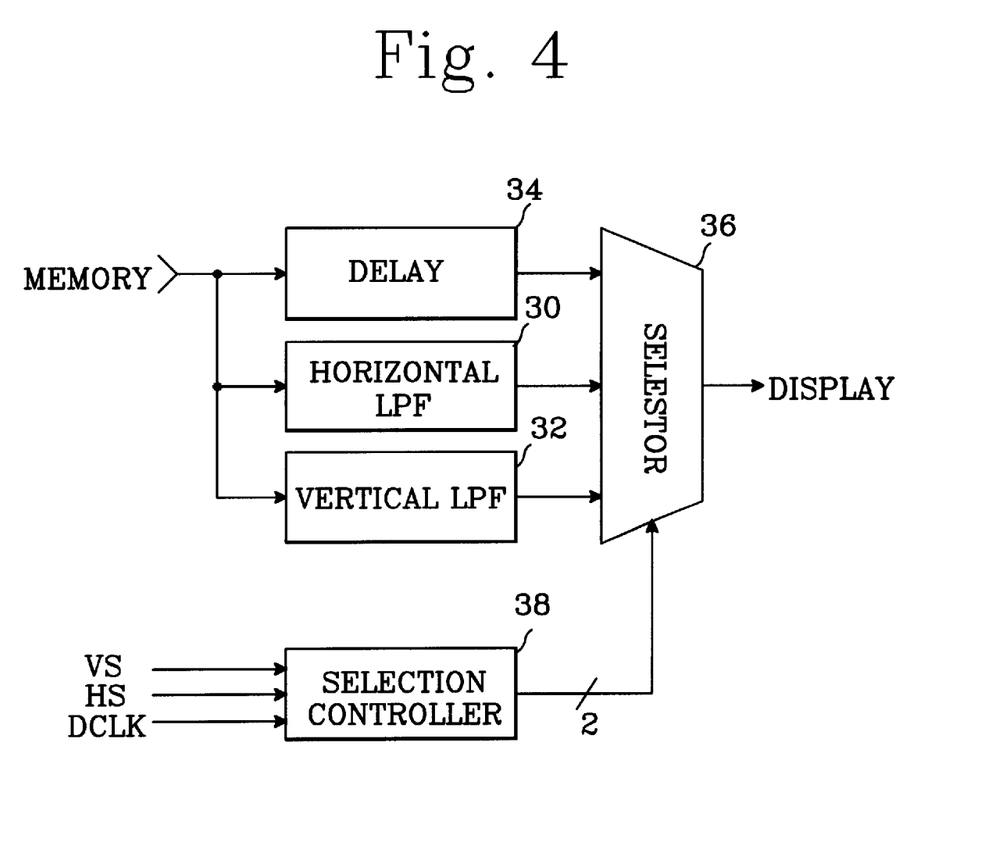
FIG. 4 is a detailed block diagram showing an embodiment of the selective filter in FIG. 3.

FIG. 4 shows in detail an embodiment of the selective filter 24 in FIG. 3. Referring now to FIG. 4, the selective filter 24 includes a horizontal low pass filter (LPF) 30, a vertical LPF 32, and a selector 36 for receiving image data from a delay 34. The horizontal LPF 30 makes a low pass filtering of the image data from the memory 22 of FIG. 3 in the horizontal axis to eliminate horizontal-axis discontinuous components included in the image data. The vertical LPF 32 makes a low pass filtering of the image data from the memory 22 of FIG. 3 in the vertical axis to eliminate vertical-axis discontinuous components included in the image data. The delay 34 delays the image data from the memory 22 of FIG. 3 by a propagation delay time of the horizontal LPF 30 or by a propagation delay time of the vertical LPF 32. In other words, the delay 34 meets a timing between image data passing through the horizontal LPF 30 or the vertical LPF 32 and image data to be transferred from the memory 22 into the selector 36 otherwise. The selector 36 selects any one of image data from the horizontal LPF 30, those from the vertical LPF 32 and those from the delay 34 to deliver the same to the display 26 in FIG. 26.

Further, the selective filter 24 includes a selection controller 38 for controlling the selector 30. The selection controller 38 detects boundary portions between the square blocks divided for the DCT using a pixel clock DCLK, a horizontal synchronous signal HS and a vertical synchronous signal VS. Specifically, the selection controller 38 detects vertical boundary sides using the horizontal synchronous signal HS and the pixel clock DCLK while detecting horizontal boundary sides using the horizontal and vertical synchronous signals HS and VS. Also, the selection controller 38 allows the selector 36 to select image data from the horizontal LPF 30 when the vertical boundary side is detected, to select image data from the vertical LPF 32 when the horizontal boundary side is detected, and to select image data from the delay 34 when neither the vertical side nor the horizontal side is not detected. Accordingly, any blocking components do not exist in the image data outputted from the selector 36 and, at the same time, a constant size of square blocks do not exist in the picture displayed on the display 26.

Figure 5:
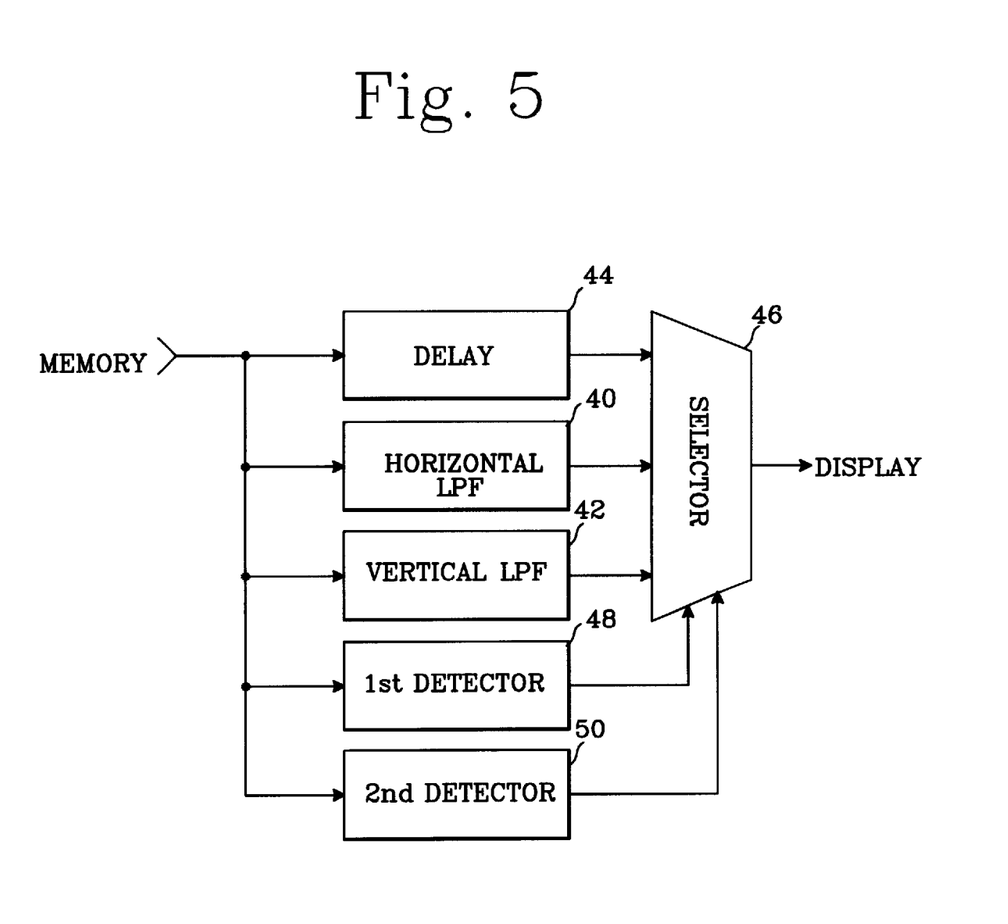
FIG. 5 is a detailed block diagram showing another embodiment of the selective filter in FIG. 3.

FIG. 5 shows in detail another embodiment of the selective filter 24 in FIG. 4. Referring to FIG. 5, the selective filter 24 includes a horizontal LPF 40, a vertical LPF 42, and a selector 46 for receiving image data from a delay 44. The horizontal LPF 40 makes a low pass filtering of the image data from the memory 22 of FIG. 3 in the horizontal axis to eliminate horizontal-axis discontinuous components included in the image data. The vertical LPF 42 makes a low pass filtering of the image data from the memory 22 of FIG. 3 in the vertical axis to eliminate vertical-axis discontinuous components included in the image data. The delay 44 delays the image data from the memory 22 of FIG. 3 by a propagation delay time of the horizontal LPF 40 or by a propagation delay time of the vertical LPF 42. In other words, the delay 44 meets a timing between image data passing through the horizontal LPF 40 or the vertical LPF 42 and image data to be transferred from the memory 22 into the selector 46 otherwise. The selector 46 selects any one of image data from the horizontal LPF 40, those from the vertical LPF 42 and those from the delay 44 to deliver the same to the display 26 in FIG. 26.

Further, the selective filter 24 includes first- and second-order detectors 48 and 50 for commonly receiving image data from the memory 22 of FIG. 3. The first-order detector 48 checks if pixel values to be displayed on two pixels adjacent in the horizontal axis in the image data have a difference to some extent, thereby detecting a vertical boundary side between the square blocks. In other words, the first-order detector 48 determines a detection of the vertical boundary side when two pixel values adjacent in the horizontal axis have a difference greater than a predetermined range. In this case, the first-order detector 48 applies a specific logic, e.g., high logic, of first selection control signal to the selector 46, thereby allowing the selector to select image data from the horizontal LPF 40. The second-order detector 50 checks if pixel values to be displayed on two pixels adjacent in the vertical axis in the image data are same, thereby detecting a horizontal boundary side between the square blocks. In other words, the second-order detector 50 determines a detection of the horizontal boundary side when two pixel values adjacent in the vertical axis have a difference greater than a predetermined range. In this case, the second-order detector 50 applies a specific logic, e.g., high logic, of second selection control signal to the selector 46, thereby allowing the selector 46 to select image data from the vertical LPF 42. Otherwise, when either of the first and second selection control signals generated at the first- and second-order detectors 48 and 50, respectively, have not a specific logic, the selector 46 selects image data from the delay 44. The selector 46 is controlled by means of the first- and second-order detectors 48 and 50, so that any blocking components do not exists in the image data outputted from the selector 46 and, at the same time, a constant size of square blocks do not exists in the picture displayed on the display 26.

Figure 6:
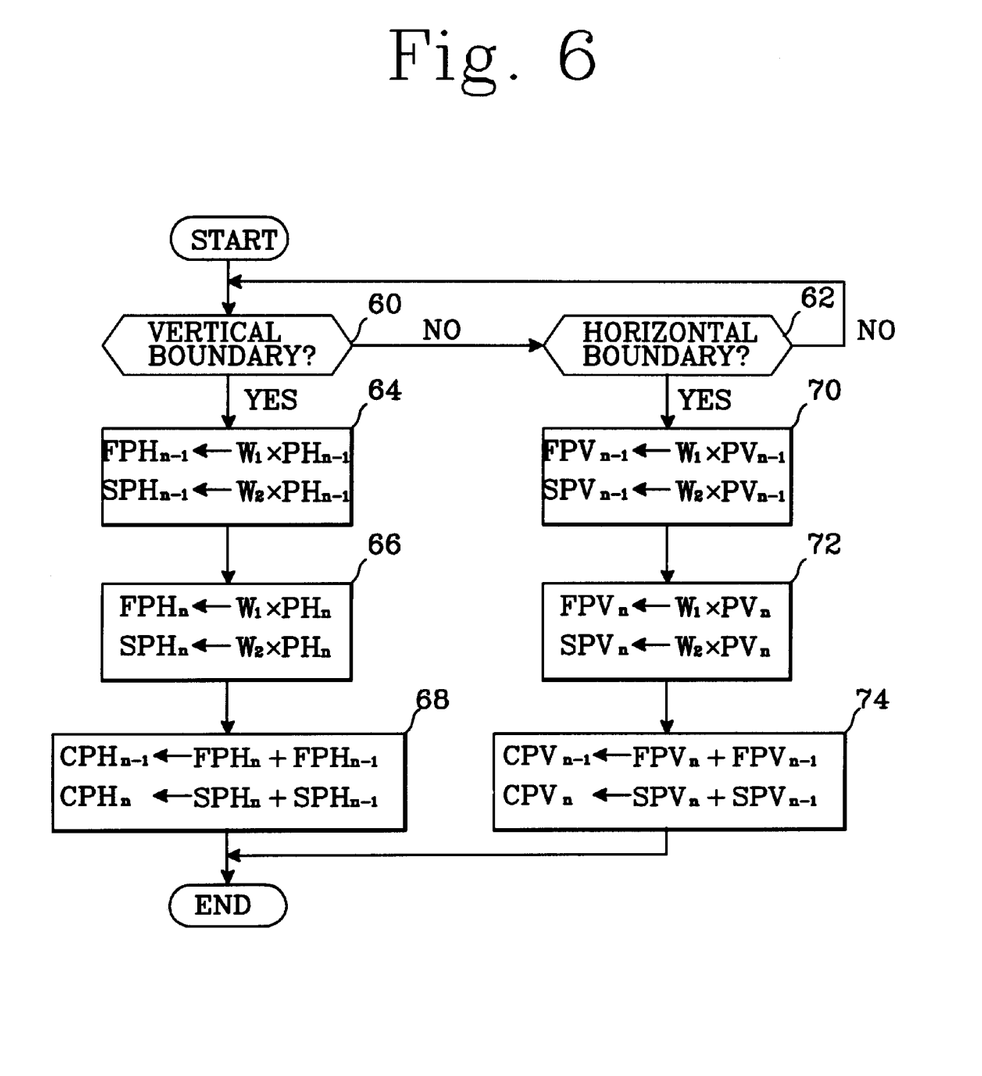
FIG. 6 is a flow chart for explaining operation procedures of the selective filter in FIG. 3.

FIG. 6 illustrates in detail the operational procedure for selectively filtering image data from the memory 22 using the selective filter 24 in FIG. 3.

Referring now to FIG. 6, the selective filter 24 determines whether or not pixel data to be displayed on the vertical boundary sides between the square blocks have been received, or whether or not pixel data to be displayed on the horizontal boundary sides between the square blocks have been received in steps 60 and 62.

Then, in step 64, if pixel data to be displayed on the vertical boundary sides have received in step 60, then the selective filter 24 calculates the first and second horizontal substitution data $FPH_{n-1}$ and $SPH_{n-1}$ with respect to pixel data $PH_{n-1}$ inputted prior to the current pixel data by the following formulas:

$$FPH_{n-1} = \omega_1 \times PH_{n-1} \quad (1)$$

$$SPH_{n-1} = \omega_2 \times PH_{n-1} \quad (2)$$

Subsequently, in step 66, the selective filter 24 calculates the first and second horizontal substitution data $FPH_n$ and $SPH_n$ with respect to the current pixel data $PH_n$ by the following formulas:

$$FPH_n = \omega_1 \times PH_n \quad (3)$$

$$SPH_n = \omega_2 \times PH_n \quad (4)$$

Consequently, in step 68, the selective filter 24 adds the first horizontal substitution data $FPH_{n-1}$ and $FPH_n$ for the previous and current pixel data $PH_{n-1}$ and $PH_n$, respectively, to generate a corrected previous pixel data $CPH_{n-1}$, and adds the second horizontal substitution data $SPH_{n-1}$ and $SPH_n$ for the previous and current pixel data $PH_{n-1}$ and $PH_n$ respectively, to generate a corrected current pixel data $CPH_n$. The corrected previous pixel data $CPH_{n-1}$ and the corrected current pixel data $CPH_n$ produced in the above manner are supplied to the display 26 in place of the previous and current pixel data $PH_{n-1}$ and $PH_n$. These corrected previous and current pixel data $CPH_{n-1}$ and $CPH_n$ allow a picture in the boundary side between the left and right adjacent square blocks, that is, in the vertical boundary side to change continuously, thereby eliminating vertical-side blocking picture components contained in the image data.

On the other hand, in step 70, if pixel data to be displayed on the horizontal boundary sides have received in step 62, then the selective filter 24 calculates the first and second vertical substitution data $FPV_{n-1}$ and $SPV_{n-1}$ with respect to previous line pixel data $PV_{n-1}$ inputted one line before the current line pixel data by the following formulas:

$$FPV_{n-1} = \omega_1 \times PV_{n-1} \quad (5)$$

$$SPV_{n-1} = \omega_2 \times PV_{n-1} \quad (6)$$

Subsequently, in step 72, the selective filter 24 calculates the first and second vertical substitution data $FPV_n$ and $SPV_n$ with respect to the current line pixel data $PV_n$ by the following formulas:

$$FPV_n = \omega_1 \times PV_n \quad (7)$$

$$SPH_n = \omega_2 \times PV_n \quad (8)$$

Consequently, in step 74, the selective filter 24 adds the first vertical substitution data $FPV_{n-1}$ and $FPV_n$ for the previous and current line pixel data $PV_{n-1}$ and $PV_n$, respectively, to generate a corrected previous line pixel data $CPV_{n-1}$, and adds the second vertical substitution data $SPV_{n-1}$ and $SPV_n$ for the previous and current line pixel data $PV_{n-1}$ and $PV_n$, respectively, to generate a corrected current line pixel data $CPV_n$. The corrected previous line pixel data $CPV_{n-1}$ and the corrected current line pixel data $CPV_n$ produced in the above manner are supplied to the display 26 in place of the previous and current line pixel data $PV_{n-1}$ and $PV_n$. These corrected previous and current line pixel data $CPV_{n-1}$ and $CPV_n$ allow a picture in the boundary side between the up and down adjacent square blocks, that is, in the horizontal boundary side to change continuously, thereby eliminating horizontal-side blocking picture components contained in the image data.

As described above, in a digital image decoding apparatus having a function of suppressing the blocking effects according to the present invention, pixel data to be displayed on the boundary sides of the square blocks divided for the DCT are corrected to suppress or reduce the blocking picture components contained in the decoded image data. Accordingly, the digital image decoding apparatus according to the present invention is capable of reconstructing and displaying the image data compressed by the coding method employing the DCT standard without occurring any blocking effects.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A digital image decoding apparatus having a function of suppressing blocking effects, comprising:
    input means for receiving image data coded in accordance with a coding method adopting a discrete cosine transform (DCT);
    decoding means for performing an inverted discrete cosine transform (IDCT) for the coded image data from the input means to decode original image; and
    filtering means, responsive to a pixel clock and synchronous signals, for selectively filtering the decoded image data from the decoding means to eliminate blocking picture components, wherein said filtering means comprises,
        a first low pass filter for making a low pass filtering of the decoded image data from the decoding means in the horizontal axis,
        a second low pass filter for making a low pass filtering of the decoded image data from the decoding means in the vertical axis, and
        switching means, responsive to the pixel clock and the synchronous signals, for selectively delivering image data from the first and second low pass filters and the decoded image data from the decoding means, wherein said switching means comprises:
            a first difference component detector for detecting difference components between the decoded image data from the decoding means and the data to be displayed using adjacent pixels in the horizontal axis; and
            a second difference component detector for detecting difference components between the decoded image data from the decoding means and the data to be displayed using adjacent pixels in the vertical axis; and
            a selector that responds to output signals of the first and second difference component detectors and selects any one of the decoded image data from the decoding means and the image data from the first and second low pass filters.

2. The digital image decoding apparatus as claimed in claim 1, further comprising:
    delay means connected between the decoding means and the switching means for synchronizing the decoded image data to be transferred from the decoding means to the switching means with the image data to be transferred from one of the first and second low pass filters to the switching means.

3. The digital image decoding apparatus as claimed in claim 2, wherein said switching means comprises:
    a selection controller for detecting vertical-side blocking picture components using the pixel clock and a horizontal synchronous signal and detecting horizontal-side blocking picture components using the horizontal synchronous signal and a vertical synchronous signal, and for controlling a selective operation of the selector in accordance with the detected results.

4. The digital image decoding apparatus as claimed in claim 1, wherein said selector selects the image data from the first low pass filter when the first difference component detector detects difference components; selects the image data from the second low pass filter when the second difference component detector detects difference components; and selects the decoded image data from the decoding means when either of the first and second difference component detectors fail to detect difference components.

5. The digital image decoding apparatus of claim 1, wherein the decoded image data is a single frame of image data, and wherein the image data from the first and second low pass filters are included in the single frame decoded image data.

6. A digital image decoding method having a function of suppressing blocking effects, comprising:
 (A) receiving image data coded in accordance with a coding method adopting a discrete cosine transform (DCT);
 (B) performing an inverted discrete cosine transform (IDCT) for the coded image data to decode original image data; and
 (C) selectively filtering the decoded image data to eliminate blocking picture components, wherein said step (C) comprises,
 (D) making a low pass filtering of the decoded image data in the horizontal axis,
 (E) making a low pass filtering of the decoded image data in the vertical axis, and
 (F) selectively delivering the vertical low pass filtered decoded image data, the horizontal low pass filtered decoded image data and the decoded image data, wherein said step (F) includes detecting vertical-side blocking picture components using a pixel clock and a horizontal synchronous signal and detecting horizontal-side blocking picture components using the horizontal synchronous signal and a vertical synchronous signal, and selecting any one of the horizontal and vertical low pass filtered decoded image data and the decoded image data in accordance with the detected results.

7. The digital image decoding method as claimed in claim 6, further comprising:
 (G) synchronizing the decoded image data with the vertical and horizontal low pass filtered decoded image data.

8. The digital image decoding method as claimed in claim 6, wherein said step (F) includes selecting the horizontal low pass filtered decoded image data when there is a difference between the data to be displayed on adjacent pixels in the horizontal axis; selecting the vertical low pass filtered decoded image data when there is a difference between the data to be displayed on adjacent pixels in the vertical axis, and selecting the decoded image data when all the data to be displayed on the adjacent pixels are identical to each other.

9. The digital image decoding method of claim 6, wherein the decoded image data is a single frame of image data.

10. A digital image decoding apparatus, comprising:
 a decoder that receives image data coded in accordance with a coding method adopting a discrete cosine transform (DCT) and performs an inverted discrete cosine transform (IDCT) for the coded image data; and
 a filter, responsive to a pixel clock and synchronous signals, that selectively filters decoded image data from the decoder to eliminate blocking picture components, wherein the filter, comprises:
 a low pass filter that low pass filters the decoded image data from the decoder;
 a selector that selects either the decoded image data from the decoder or the image data from the low pass filter; and
 a selection controller that detects difference components of the decoded image data, which represent block boundary sides between data to be displayed using adjacent pixels, to control a selective operation of the selector in accordance with the detected difference components, wherein said low pass filter filters the decoded image data from the decoder in the horizontal axis and in the vertical axis, wherein said selector selects any one of the decoded image data from the decoder and horizontal or vertical image data from the low pass filter, and wherein said selection controller detects vertical-side blocking picture components using the pixel clock and a horizontal synchronous signal and detects horizontal-side blocking picture components using the horizontal synchronous signal and a vertical synchronous signal to control the selective operation of the selector.

11. The digital image decoding apparatus of claim 10, wherein said selection controller comprises:
 a first detector that detects difference components between the decoded image data from the decoder and the data to be displayed on adjacent pixels in the horizontal axis; and
 a second detector that detects difference components between the decoded image data from the decoder and the data to be displayed on adjacent pixels in the vertical axis, wherein said selector responds to output signals of the first and second detectors and selects any one of the decoded image data from the decoder and the horizontal or vertical image data from the low pass filter.

12. The digital image decoding apparatus of claim 10, wherein the decoded image data is a single frame of image data, and wherein the adjacent pixels are included in the single frame decoded image data.

13. A digital image decoding method having a function of suppressing blocking effects, comprising:
 (A) receiving image data coded in accordance with a coding method adopting a discrete cosine transform (DCT);
 (B) performing an inverted discrete cosine transform (IDCT) for the coded image data to decode original image data; and
 (C) selectively filtering the decoded image data to eliminate blocking picture components, wherein said step (C) comprises,
 (D) making a low pass filtering of the decoded image data in the horizontal axis,
 (E) making a low pass filtering of the decoded image data in the vertical axis, and
 (F) selectively delivering the vertical low pass filtered decoded image data, the horizontal low pass filtered decoded image data and the decoded image data, wherein said step (F) includes detecting difference components between the decoded image data and the data to be displayed using adjacent pixels in the vertical axis, and selecting any one of the horizontal and vertical low pass filtered decoded image data and the decoded image data in accordance with the detected results of difference components.

14. The digital image decoding method of claim 13, wherein the decoded image data is a single frame of image data, and wherein the adjacent pixels are included in the single frame decoded image data.

* * * * *